(12) United States Patent
Ddamulira et al.

(10) Patent No.: US 10,775,296 B2
(45) Date of Patent: Sep. 15, 2020

(54) ADHESIVE TESTING APPARATUS AND METHOD

(71) Applicant: W. F. Taylor LLC, Dalton, GA (US)

(72) Inventors: Robert Kintu Ddamulira, Chattanooga, TN (US); Daniel Arnold Pelton, Brentwood, TN (US)

(73) Assignee: W.F. TAYLOR LLC, Dalton, GA (US)

( * ) Notice: Subject to any disclaimer, the term of this patent is extended or adjusted under 35 U.S.C. 154(b) by 379 days.

(21) Appl. No.: 15/782,206

(22) Filed: Oct. 12, 2017

(65) Prior Publication Data

US 2019/0113441 A1 Apr. 18, 2019

(51) Int. Cl.
*B32B 41/00* (2006.01)
*G01N 19/04* (2006.01)
*G01N 19/08* (2006.01)
*B29C 65/82* (2006.01)
*B29C 65/48* (2006.01)

(52) U.S. Cl.
CPC ......... *G01N 19/04* (2013.01); *B29C 65/4855* (2013.01); *B29C 65/8223* (2013.01); *B29C 65/8246* (2013.01); *G01N 19/08* (2013.01)

(58) Field of Classification Search
CPC .... G01N 19/04; G01N 19/08; B29C 65/4855; B29C 65/8223; B29C 65/8246

USPC .......................... 156/64, 350, 351, 378, 379
See application file for complete search history.

(56) References Cited

U.S. PATENT DOCUMENTS

2018/0003616 A1* 1/2018 Brossier .............. G01M 5/0016

FOREIGN PATENT DOCUMENTS

WO    WO-2016071649 A1 * 5/2016 .......... G01M 5/0016

* cited by examiner

*Primary Examiner* — Michael N Orlando
*Assistant Examiner* — Joshel Rivera
(74) *Attorney, Agent, or Firm* — Dilworth & Barrese, LLP

(57) ABSTRACT

A device and method are provided for testing the effectiveness of an adhesive composition to adhere a sheet of material to a substrate. A connector is attached to the sheet and the adhesive is used to adhere the sheet to the substrate and permitted to cure to a selected amount. After (or even before, if desired) the adhesive cures, a load is applied to the connector, having the effect of pulling the sheet away from the substrate. The duration of the pulling and the amount of the load can be varied. If too large a dome is formed under the location of the connector, the adhesive does not pass the test. Optionally, the adhesive formulation is adjusted to make it stronger to resist such doming.

22 Claims, 4 Drawing Sheets

ADHESIVE TESTING APPARATUS AND METHOD

BACKGROUND OF THE INVENTION

The invention relates generally to an adhesive testing method and a testing assembly for performing the test method.

ASTM D1002 is a method commonly performed to measure the shear strength of adhesives that are used to bond metals. ASTM D1002 is similar to ASTM D3163 and is for adhesives that bond rigid plastic substrates. ASTM D3164 provides a method for testing the strength of plastic adhesives that are used to bond both plastic and metal substrates. These methods use a single lap joint (lap shear) specimen to determine the shear strength of the adhesive tested.

In general, the shear area is first calculated in, for example, square inches or square centimeters. The specimen is loaded into the grips of a tensile test machine and force is applied at a controlled rate to pull the joint until the specimen breaks apart. The tensile machine records the maximum force and the type of failure. There are a number of other ASTM methods for measuring adhesive shear strength, including tests that measure creep properties and the effects of temperature on failure. However, while these tests provide useful information they have not been found to be fully satisfactory in measuring the ability of an adhesive to properly secure a carpet or tile to an existing substrate.

Accordingly, it is an object of the invention to provide an improved method and apparatus for performing the method, to overcome the inadequacies and limitations of the prior art.

SUMMARY OF THE INVENTION

Generally speaking, in accordance with the invention, an apparatus and method are provided for testing the effectiveness of an adhesive composition to adhere a sheet of material, such as a carpet tile or any other soft tile subject to doming, to a substrate. A connector is attached to the carpet tile. Adhesive is applied to the substrate or the bottom of the tile. The tile is placed against a substrate and the adhesive is permitted to cure, to adhere the carpet tile to the substrate. After the adhesive cures, a load is applied to the connector, having the effect of pulling attached portion of the tile away from the substrate. The duration of the pulling and the amount of the load can be varied. Preferably, the load is from about 0.25 to about 2 pounds, more preferably from about 0.33 to about 1 pound, most preferably about 0.5 pounds. Preferably, the duration is more than about 8 to 14 hours, preferably more than about 18 hours, most preferably about 24 to 48 hours.

The material adhered to the substrate should have some pliability. Wood or ceramic tile is not suitable. The most suitable tile is multilayer carpet tile having a PVC or polyolefinic backing. Vinyl tile that can exhibit doming is suitable, as the carpet top is not needed for the testing.

Typically, any separation between the carpet and the substrate will be in the form of a dome, circumscribing a separation circle on the substrate. The diameter of the circle under the dome is then measured. Depending on the force and duration of pulling an indication of acceptable results corresponds to a circle having a diameter no more than about 8 inches. More superior adhesives will exhibit a dome diameter of under about 6 inches. The test will indicate the most superior adhesives having a diameter of no more than 5 inches.

A device for performing the method can include a tension system capable of sustaining a constant tension on a carpet connector for a duration of at least 8-12, preferably 24, more preferably 48 hours.

Still other objects of the invention will in part be obvious and will, in part be apparent from the specification and drawings. The invention accordingly comprises the article of manufacture, the method of making the article and the method of using the article, which will be exemplified in the articles and methods hereinafter described, and the scope of the invention will be indicating the claims.

BRIEF DESCRIPTION OF THE DRAWINGS

For a fuller understanding of the invention, reference is had to the following description, taken in connection with the accompanying drawing, in which.

As used herein, like reference numerals will be used to refer to similar structures.

DETAILED DESCRIPTION OF THE PREFERRED EMBODIMENTS

An adhesive test and apparatus for performing the test in accordance with preferred embodiments of the invention simulates forces acting on an adhered sheet, such as a tile, which cause it to "dome". The test is appropriate for any pliable tiles or sheet materials that are subject to doming. Examples can include certain carpet tiles, vinyl backed fabric sheets, vinyl tiles, linoleum and linoleum tiles and so forth as will be apparent to those skilled in the art. Tests in accordance with the invention have greater correspondence to real-world situations and can predict with better certainty, whether an adhesive composition will be suitable or whether it needs to be improved. The test involves adhering a pliable sheet of material, such as a carpet tile, to a substrate (e.g. a sheet of plywood or a cement slab) and then applying a predetermined pulling force, to the sheet. Preferably, the force is applied as a perpendicular dead load to the center of the glued-down tile. The test involves continuing to apply the static force for a pre-determined duration. The test can be performed on a fully or partially cured adhesive. The test can also provide valuable information to help formulate an adhesive.

Figure 1:
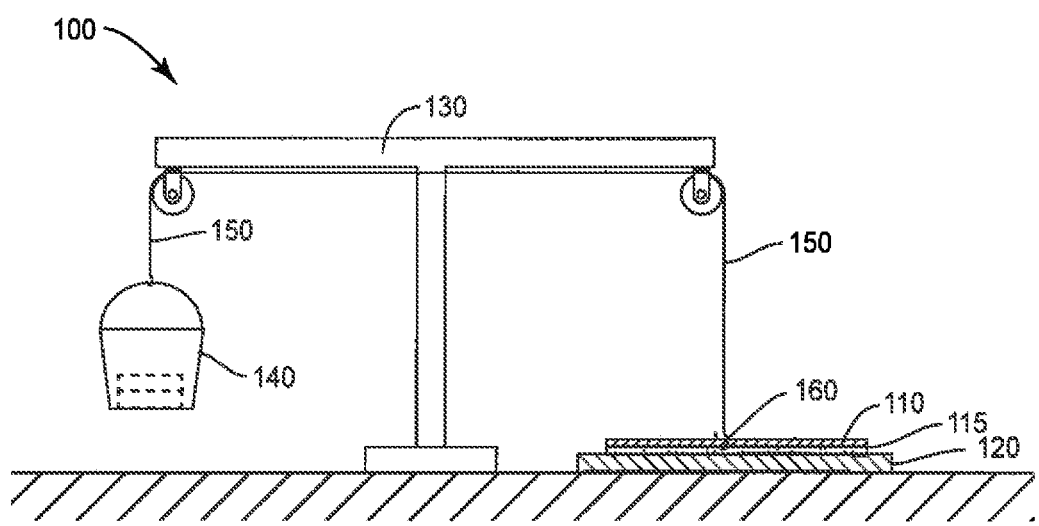
FIG. 1 is a side view of an adhesive testing apparatus, in accordance with a preferred embodiment of the invention.

A testing apparatus 100 for performing an adhesive evaluation test in accordance with the invention is shown generally in FIG. 1. Testing device 100 measures how well a layer of adhesive 115 will adhere carpet tile 110 to a substrate 120 under simulated "real world use" conditions. In particular, apparatus 100 measures the ability of adhesive 115 to resist "doming," a term discussed below.

Figure 4:
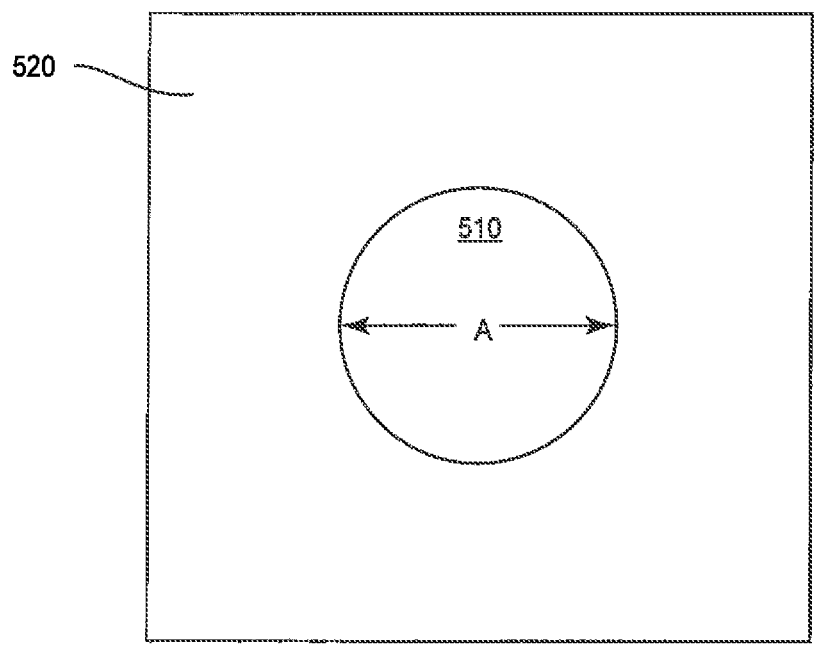
FIG. 4 is an illustrative top view of a carpet tile experiencing doming.
Figure 5:
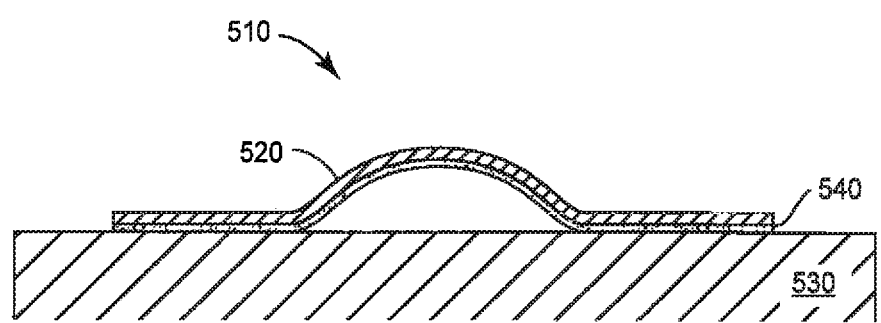
FIG. 5 is a cross-sectional view of the carpet tile of FIG. 4.

Referring to FIGS. 4 and 5, as used herein, "doming" will refer to the dome-shaped bulge 510 that occurs when a carpet or tile 520 that had been adhered to a substrate 530 with a layer of adhesive 540 separates from substrate 540 and forms a dome shaped bulge. The diameter of dome 510 is the edge-to-edge width, as shown by double arrow A in FIG. 4, where the tile is still adhered to the substrate. A suitable adhesive will resist the formation of a dome under selected conditions.

Testing apparatus 100 includes a beam 130 having a static weight 140 on one side. The weight may take any form. Here, weight 140 comprises a bucket filled with weights. It can also be filled with water or attached to springs or bands. A line 150 extends from static weight 140 to an attachment member 160, which is attached to carpet tile 110. In FIG. 1, attachment member 160 is a hook and a few millimeters of the hook can extend under tile 110. In other embodiments of the invention, the attachment member can take the form of a disc or bar at the underside of tile 110. Care should be taken, so that the thickness of attachment member 160 does not cause too much separation between tile 110 and substrate 120. Therefore, the minimal interference of a hook is preferred.

Figure 2:
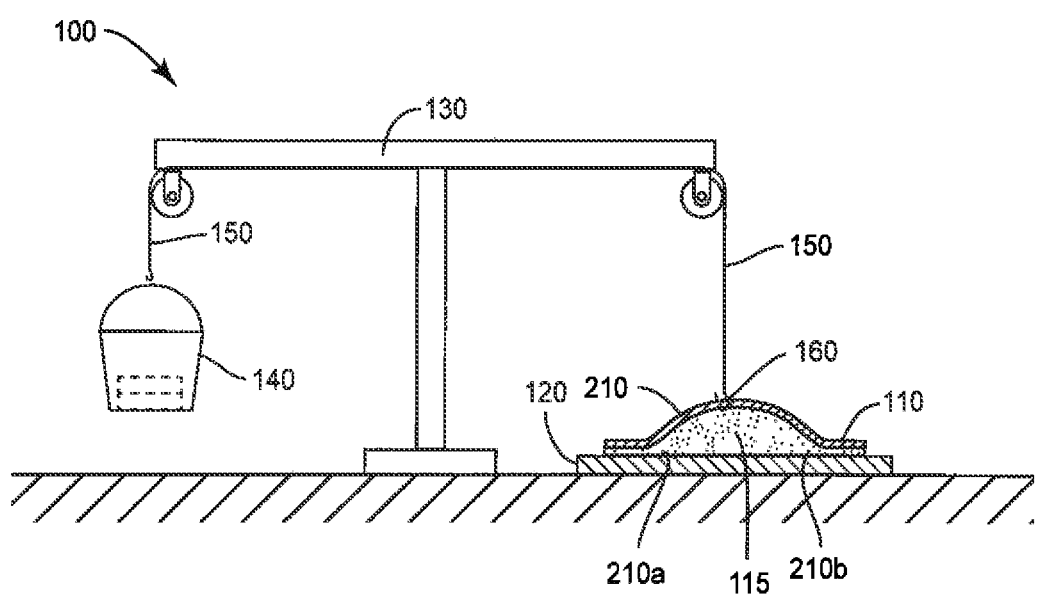
FIG. 2 is a side partial cross-sectional view of the testing apparatus of FIG. 1, after doming is induced.

FIG. 2 depicts the assembly of FIG. 1, after sufficient time has passed, such that the upward force exerted by attachment member 160 causes a partial separation between tile 110 and substrate 120, to form a dome 210. The diameter or width of dome 210 extends from edge 210a to edge 210b.

Figure 3:
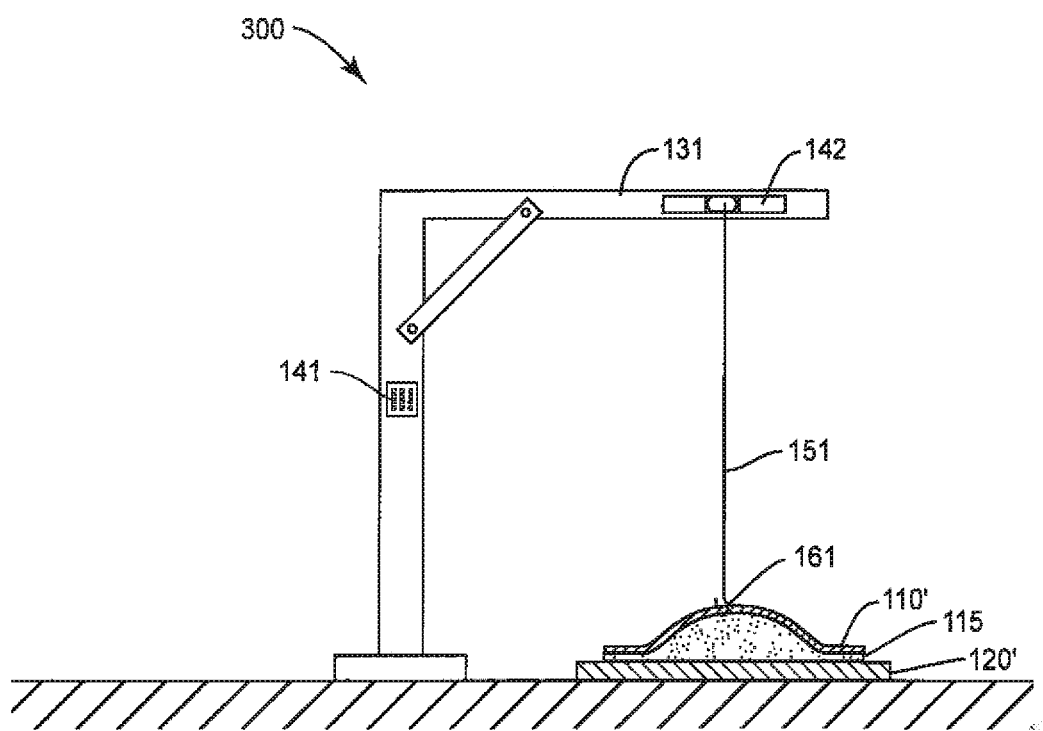
FIG. 3 is a side partial cross-sectional view of a testing device in accordance with another embodiment of the invention.

A mechanized testing apparatus 300 is shown generally in FIG. 3. A substrate 120 has a carpet tile 110 adhered thereto with the layer of adhesive 115. An attachment member 161 extends to the underside of tile 110. Attachment member 161 is coupled to a line 151, which itself extends into a mechanized tension device 131. Mechanized tension device 131 can apply tension at a preset amount. The amount and duration can be selected with a keypad 141, as shown on force display 142. Alternatively, a tension spring or band can be substituted for line 151.

Adhesive testing apparatus 100, mechanized testing apparatus 300 and variations thereof can be used to apply a selected pulling force, directed to separate a sheet of material, e.g., a carpet tile, that has been adhered to a substrate with an adhesive. By analyzing the amount of weight selected and the duration selected for which the weight was applied, the effectiveness of the adhesive to resist "doming" can be calculated. If domes form to readily, the adhesive should be reformulated or not used to adhere the selected material.

In the examples of the test identified below in Table 1, the dead load applied was varied from 0.5 pound to 5 pounds and the time it was applied was also varied from 10 minutes to 14 hours. To simulate the different forces at play in the "doming" process, a comparison of low load (0.50 pounds) applied for an extended period (14 hours) and a heavier load (5 pounds) applied over a shorter period (10-20 minutes) was completed. The effect of these forces and their ability to predict the effectiveness of a carpet adhesive were gauged by measuring the diameter of the dome, i.e., the de-bonded tile, which formed a dome away from the substrate at the center of the tile. All of the tsted adhesives were generally accepted in the art as acceptable and therefore, should have all passed the doming test.

The extent of doming resistance was determined by measuring the diameter of the de-bonded area around the "dome" or lift from the center of the tile to the outer edge of the circumferential release area. The results are listed in the Table 1 below. Note that all the adhesives were considered acceptable, but that some exhibited exceptional performance under the testing in accordance with the invention.

As can be seen, at both the 5 lb. and 1 lb. dead load levels, all adhesive samples, although known to be acceptable, did not prevent the tile from "doming" (except for one "extra strength" formulation). Because all these adhesives have exhibited acceptable performance under actual in-use conditions, the 1 and 5 lb tests indicated that the equivalent of a 1 or 5 pound force was likely more than the tension force that the tile is likely to encounter during use conditions. Therefore, the test was repeated with half pound-force for 14 hours. At this dead load level, "doming" was observed with all formulation albeit at a more relevant level of not more than about 5 inches.

To even better simulate the "doming" force effect on adhesives, the experiment was repeated with a lower dead weight applied force of 0.5 pounds, but applied for a longer time period (24 to 48 hours).

Another observation from the experiments in accordance with the invention, increasing the tack level of the adhesive with a second coat does not always result in better resistance to "doming".

The data clearly demonstrate that some high strength products exhibited superior tack and superior resistance to doming even when excessive tension (1-5 pound force) is applied. By incorporating a balance of shear, peel, cohesive, and adhesive properties, products can be formulated that withstand the tension forces that causes tiles to dome after installation. Thus, after assessing the results of the doming tests described herein, the strength of the adhesive can be assessed and increased, if necessary to help resist doming.

TABLE 1

| | Doming Diameter (inches) Dead Load | | | | | |
|---|---|---|---|---|---|---|
| | 5 lbs. dead load | | 1 lb. dead load | | 0.5 lbs | 0.5 lbs (two coats) |
| | Dwell Time | | | | | |
| | 10 minutes. | 20 minutes | 10 minutes | 20 minutes | 14 hours | 14 hours |
| Adhesive A | 16.5 | 22.0 | 9.5 | 11.0 | 3.5 | 3.5 |
| Adhesive B | 18.5 | 22.0 | 9.5 | 11.0 | 3.5 | 3.5 |
| Adhesive C | 22.5 | 24.0 | 13.5 | 20.0 | 4.5 | 4.5 |
| Adhesive D | 22.0 | 24.0 | 13.0 | 18.0 | 4.5 | 4.0 |
| Adhesive E. | 17.5 | 22.5 | 10.3 | 11.0 | 3.5 | 4.0 |
| Adhesive F | 17.0 | 21.5 | 8.5 | 9.5 | 3.5 | 4.0 |
| Adhesive G | 13.8 | 18.0 | 9.5 | 10.5 | 3.5 | 3.0 |
| Adhesive H | | | 3.0 | 3.5 | 3.3 | 3.3 |

A testing method in accordance with the invention should apply a pulling load on a pliable sheet of material from about 0.25 to about 1 pound, more preferably from about 0.33 to about 0.75 pounds, most preferably about 0.5 pounds. The duration of the test should be selected as at least about 8 hours, preferably more than about 14 hours, most preferably about 24 to 48 hours.

Typically, any separation between the carpet and the substrate will be in the form of a dome. An indication of acceptable results corresponds to a dome having a diameter no more than about 8 inches, depending on circumstances. More superior adhesives will exhibit a dome diameter of no more than about 5 inches. The test will indicate the most superior adhesives lead to a dome diameter of no more than about 4 inches.

It will thus be seen that the objects set forth above, among those made apparent from the preceding description, are efficiently attained, and, since certain changes may be made in carrying out the above method and in the article of manufacture set forth, without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A method of testing the resistance of an adhesive to doming, comprising the steps of:
    adhering a sheet of pliable material to a substrate with an adhesive;
    applying pulling force, applied to pull a test location of the sheet away from the substrate with a selected amount of force for a selected amount of time and forming a dome of separated pliable material over the substrate and under the test location; and
    measuring the width of the separated portion that forms the dome between the sheet and the substrate under the test location.

2. The method of claim 1, wherein the sheet is a carpet tile.

3. The method of claim 1, wherein the pulling force is applied by fastening a line to the sheet at the test location and applying force to the line in a direction to pull the sheet away from the substrate.

4. The method of claim 1, and comprising assessing the suitability of the adhesive based on the width of the separation portion, the amount of force and the amount of time.

5. The method of claim 4, comprising assessing as suitable any adhesive resulting in a dome of less than 5 inches after applying a tension of at least 0.5 pounds for at least 8 hours.

6. A method of assessing the suitability of an adhesive for adhering a pliable sheet of material to a substrate, comprising:
    adhering a pliable sheet of material to a substrate with an adhesive;
    pulling a test location of the sheet away from the substrate with a selected amount of force for a selected amount of time;
    measuring the width of any separation portion that forms between the sheet and the substrate at the test location; and
    assigning a passing designation to any adhesive achieving a separation width of no more than a selected width.

7. The method of claim 6, wherein the selected width is 5 inches.

8. The method of claim 6, wherein the duration of pulling is at least about 8 hours.

9. The method of claim 6, wherein the force of pulling is no more than about 1 pound.

10. The method of claim 6, wherein the duration of pulling is at least about 12 hours and the force is no more than about 0.75 pounds.

11. The method of claim 6, wherein the amount of force is at least 0.25 pounds and the selected width is about 5 inches.

12. The method of claim 6, wherein the duration of pulling is at least about 8 hours, the force is at least about 0.33 pounds and the selected width is no more than about 5 inches.

13. The method of claim 6, comprising adjusting the composition of the adhesive to make it stronger if the width of the separation exceeds the selected width.

14. The method of claim 12, comprising adjusting the composition of the adhesive to make it stronger if the width of the separation exceeds about 5 inches.

15. The method of claim 6, wherein the duration of pulling is at least about 12 hours and the force is at least 0.25 pounds, comprising adjusting the composition of the adhesive to make it stronger if the width of the separation exceeds the selected width.

16. The method of claim 15, wherein the selected width is 5 inches.

17. An adhesive testing apparatus, comprising:
    a pliable sheet of material having a peripheral region at an edge of the sheet and a central region inward from the peripheral region and a substrate to which the pliable sheet is adhered with an adhesive between the sheet and the substrate at least at the central region;
    an attachment member secured at an attachment point to the central region of the sheet;
    a tension member attached to the attachment member, the attachment member and the tension member constructed and arranged, so that pulling upward on the tension member imparts upward force to the pliable sheet and exerts a separation force separating the pliable sheet from the substrate at a location around the attachment point;
    a weight member coupled to the tension member, adapted to impart upward force to the tension member.

18. The adhesive testing apparatus of claim 17, wherein the pliable sheet is a carpet tile.

19. The adhesive testing apparatus of claim 17, wherein the attachment member is a hook or clip.

20. The adhesive testing apparatus of claim 17, wherein the tension member is a line, attached with at least one pully to the weight member.

21. The adhesive testing apparatus of claim 20, wherein the weight member is an object with a designated weight or a motor exerting a level of force.

22. The adhesive testing apparatus of claim 17, wherein the pliable sheet is a carpet tile, the attachment member is a hook or clip, and the tension member is a line, attached with at least one pully to the weight member.

* * * * *